(12) United States Patent
Dolecek

(10) Patent No.: US 7,352,906 B2
(45) Date of Patent: Apr. 1, 2008

(54) CONTINUOUS TRANSFORM METHOD FOR WAVELETS

(75) Inventor: Quentin E. Dolecek, Dayton, MD (US)

(73) Assignee: The Johns Hopkins University, Baltimore, MD (US)

( * ) Notice: Subject to any disclaimer, the term of this patent is extended or adjusted under 35 U.S.C. 154(b) by 593 days.

(21) Appl. No.: 10/494,658

(22) PCT Filed: Nov. 6, 2002

(86) PCT No.: PCT/US02/35533

§ 371 (c)(1),
(2), (4) Date: Jul. 28, 2004

(87) PCT Pub. No.: WO03/041389

PCT Pub. Date: May 15, 2003

(65) Prior Publication Data

US 2004/0249875 A1    Dec. 9, 2004

Related U.S. Application Data

(60) Provisional application No. 60/333,393, filed on Nov. 6, 2001.

(51) Int. Cl.
*G06K 9/46* (2006.01)
*H04B 1/66* (2006.01)
*G06K 9/36* (2006.01)

(52) U.S. Cl. .................. 382/240; 375/240.19

(58) Field of Classification Search ................ 382/232, 382/240, 248, 263, 264, 302, 303, 304; 708/203, 708/300, 308, 317, 313, 400, 401, 820; 375/240.11, 375/240.19; 341/50, 152, 155, 250
See application file for complete search history.

(56) References Cited

U.S. PATENT DOCUMENTS 3,754,128 A    8/1973    Corinthios (Continued)

OTHER PUBLICATIONS

"Investigation of Signal Characteristics Using the Continuous Wavelet Transform", John Sadowsky, Johns Hopkins APL Technical Digest, vol. 17, No. 3, pp. 258-269.

(Continued)

*Primary Examiner*—Amir Alavi
(74) *Attorney, Agent, or Firm*—Francis A. Cooch

(57) ABSTRACT

A method and system for mapping the flow data that will be the subject of wavelet transform equations to a system comprising adders, subtractors, multipliers and/or dividers to perform the mathematical functions set forth in the particular wavelet transform. A shift register is utilized to continually flow the individual data bytes of the data file being processed through the system. By mapping these hardware components to perform the computations involved in wavelet transform equations, an entire data file (e.g., a digital image) can be processed serially as it flows through the shift register triggered by a clock pulse to the shift register.

17 Claims, 4 Drawing Sheets

U.S. PATENT DOCUMENTS

| | | | |
|---|---|---|---|
| 5,537,344 A * | 7/1996 | Isshiki et al. | 708/400 |
| 5,706,220 A | 1/1998 | Vafai et al. | |
| 5,838,377 A * | 11/1998 | Greene | 375/240.11 |
| 5,984,514 A | 11/1999 | Hallmark et al. | |
| 6,052,205 A | 4/2000 | Matsuura | |
| 6,125,210 A | 9/2000 | Yang | |
| 6,178,269 B1 | 1/2001 | Acharya | |
| 6,182,102 B1 * | 1/2001 | Ramachandran et al. | 708/313 |
| 6,229,927 B1 * | 5/2001 | Schwartz | 382/248 |
| 6,246,798 B1 | 6/2001 | Andrew et al. | |
| 6,275,619 B1 | 8/2001 | Chui | |
| 6,353,634 B1 | 3/2002 | Houlberg | |
| 6,459,816 B2 | 10/2002 | Matsuura et al. | |
| 6,518,908 B2 * | 2/2003 | Boehm et al. | 341/155 |
| 6,888,970 B2 * | 5/2005 | Sandford | 382/302 |

OTHER PUBLICATIONS

"Computation of the Continuous Wavelet Transform on Massively Parallel SIMD Arrays", Feil and Uhi, Parallel Processing Letters, vol. 9, No. 4, 453-466.

"An Overview of JPEG-2000", Marcellin et al., Proc. of IEEE Data Compression Conference, pp. 523-541.

"Real Time Image Analysis Using MIMD Parallel a Trous Wavelet Algorithms", Feil and Uhl ,Real-Time Imaging, vol. 7, No. 6, p. 483-493.

"Proceedings of the 1998 IEEE International Conference on Acoosties, Speech and Signal Processing", ICASSP '98, 6 vol. 1xii+3816 pp.

"38th Midwest Symposium on Circuits and Systems", Proceedings, 2 vol. xxviii+1384 pp.

"Continuous Wavelet Transform of 1D Signals by Fourier Filtering", Caulfield and Szu, Proceedings of the SPIE, vol. 1705, pp. 314-315.

"Parallel Discrete and Continuous Wavelet Transforms", Caulfield and Szu, Optical Engineering, vol. 31, No. 9 pp. 1835-1839.

"Multi-scale Optical Image Processing", Freeman et al., 1991 IEEE International Symposium on Circuits and Systems, vol. 4, pp. 2355-2358.

Chrysafis, C. et al: "Line-Based, Reduced Memory, Wavelet Image Compression" IEEE Transactions on Image Processing, IEEE Inc. New York, US, vol. 9, No. 3, Mar. 2000, pp. 378-388.

Baghaie, R et al: "Computing Haar Transform Using Algebraic Integers" Conference Record of the 34th. Asilomar Conference on Signals, Systems, Computers, Pacific Grove, CA, USA, vol. 1, Oct. 29, 2000, pp. 438-442.

* cited by examiner

CONTINUOUS TRANSFORM METHOD FOR WAVELETS

CROSS-REFERENCE TO RELATED APPLICATIONS

This application is a 371 of PCT/US02/35533 Nov. 6, 2002 which claims the benefit of prior filed U.S. provisional Application No. 60/333,393, filed on Nov. 6, 2001, incorporated fully herein by reference.

BACKGROUND OF THE INVENTION

1. Field of the Invention

The present invention relates generally to systems and methods for processing digital data. In particular, it pertains to a system and method for performing continuous computation of wavelet transforms and can be applied to compression of individual gray scale and color images and keyframe video, for example.

2. Description of the Related Art

The need for reliable and efficient image processing has increased dramatically, particularly in the area of transmission of video, television signals, and other large-size data files. While wide-band Internet connections make it easier to transmit such information over a network, it is still a goal of developers to reduce the amount of bandwidth required to reliably conduct such transmissions.

One method of simplifying image processing is to use data compression techniques. Well-known examples of data compression techniques include Joint Photography Experts Group (JPEG) and Motion Picture Experts Group (MPEG) compression. These methods of encoding and decoding realtime video data, while better than their predecessors, are generally not capable of sufficient bandwidth reduction or are susceptible to excessive data loss in a noisy environment JPEG 2000 is an improvement over the JPEG compression method described above. JPEG 2000 compression makes use of the well-known concept of wavelet transforms to perform the compression. Wavelet transforms, described simply, involve the algorithmic transformation of an image into multiple frequency bands, with each frequency band containing the image at a quarter resolution of the original image, in varying degrees of image quality. As the band progresses from a low frequency to a high frequency, the image quality increases. Since the lowest frequency band is generally the most important band for visual sensitivity, the lowest frequency band is typically the first band transmitted, and the highest frequency band will typically be transmitted last. In this way, if only the lowest frequency band is received, the major features of the image will be visible even though the details contained in the higher frequency band are unavailable.

There are numerous wavelet transforms for transforming image data to handle image processing/compression, each of which, in their basic form, comprise a formula or series of formulas to which the image data is applied. Many examples and explanations of wavelet transforms can be found in patents and in the literature. See, for example, U.S. Pat. No. 6,178,269 to Acharya, U.S. Pat. No. 6,125,210 to Yang, Marcellin et al., "An Overview of JPEG-2000," *Proc. Of IEEE Data Compression Conference*, pp. 523-541 (2000); and Sadowsky, J., "Investigation of Signal Characteristics Using the Continuous Wavelet Transform," *Johns Hopkins APL Technical Digest*, Vol. 17, No. 3 (1996), each of which are incorporated fully herein by reference.

One example of a well-known wavelet transform is the "integer 5-3" wavelet transform. The 5-3 wavelet transform has very low complexity, provides the best lossless compression, and exhibits a minimum of ringing when quantized. The formula for the 5-3 wavelet transform is as follows:

$$\left[\left((C_1+C_2)\times\frac{1}{2}\right)-C_3\right]+\left[\left((C_3+C_4)\times\frac{1}{2}\right)-C_5\right]$$

where $C_1$ is the value of the first byte in a 5-byte sequence, $C_2$ is the value of the second byte in the 5-byte sequence, $C_3$ is the value of the third byte in the 5-byte sequence, $C_4$ is the value of the fourth byte in the 5-byte sequence, and $C_5$ is the value of the fifth byte in the 5-byte sequence. The first five bytes of a data sequence are processed using this algorithm, then another byte is moved in (and the first byte is moved out) so that the byte that originally occupied the first-byte position is bumped out, the byte that originally occupied the second-byte position is bumped up to the first-byte position, etc.

This process continues until all of the bytes of the image or data file being compressed have been subjected to the algorithm. As each five-byte sequence is processed according to the algorithm, and a transformed version of the first byte in the five-byte sequence is output for display or storage. Once all of the bytes have been processed, a transformed version of the entire image exists.

Many other wavelet transforms are known, each with their own benefits and drawbacks. For example, the "Daubechies 9-7" wavelet transform is another popular algorithm that provides high performance at low bit rates, but with a substantial increase in complexity. Instead of processing the data 5 bits at a time, as is done with the 5-3 wavelet transform, 9 bits are processed at a time in the 9-7 wavelet transform. Both filters provide for multi-resolution extraction and are responsible for much of the substantial quality improvement in JPEG 2000 over the original JPEG.

Although the data being compressed and decompressed using JPEG and JPEG 2000 consists of a series of individual data bytes (e.g., each data byte representing a single pixel in a graphic image), prior art systems process this data in blocks or sub-blocks, primarily because they typically use a Discrete Cosine Transform (DCT) to perform a digital transform, and a DCT requires that the data be processed in blocks. These data blocks, e.g., an 8×8 pixel sub-block taken from a larger 800×600 pixel block forming an entire image, are processed by a computer which computes the wavelet transform using the wavelet transform formula for each sub-block. Since wavelet transforms comprise a sequence of mathematical computations being performed on each byte of data, numerous read, process, and store operations must be performed for each byte, requiring significant processing power and storage capability. This process is repeated for each byte of each sub-block until the processed image data for the entire block (and thus the entire image) is stored in memory. Once the entire block has been processed it can then be utilized for its intended purpose. While this functions fairly well, the prior art method is inefficient and costly. The prior art method requires computers and/or digital signal processors (DSPs) and thus requires significant computing power to perform the algorithm, store the data, and save/display the data.

Accordingly, it would be desirable to have a simpler method for computing wavelet transforms on data that does not require the significant computing power of the prior art.

SUMMARY OF THE INVENTION

The present invention is a method and system for mapping the flow data that will be the subject of wavelet transform equations to a system comprising adders, subtractors, multipliers and/or dividers to perform the mathematical functions set forth in the particular wavelet transform. A shift register is utilized to continually flow the individual data bytes of the data file being processed through the system. By mapping these hardware components to perform the computations involved in wavelet transform equations, an entire data file (e.g., a digital image) can be processed serially as it flows through the shift register triggered by a clock pulse to the shift register. This eliminates the need for process computers and storage for conducting the multiple read-process-write steps required of prior art wavelet transform processors.

DETAILED DESCRIPTION

Figure 1:
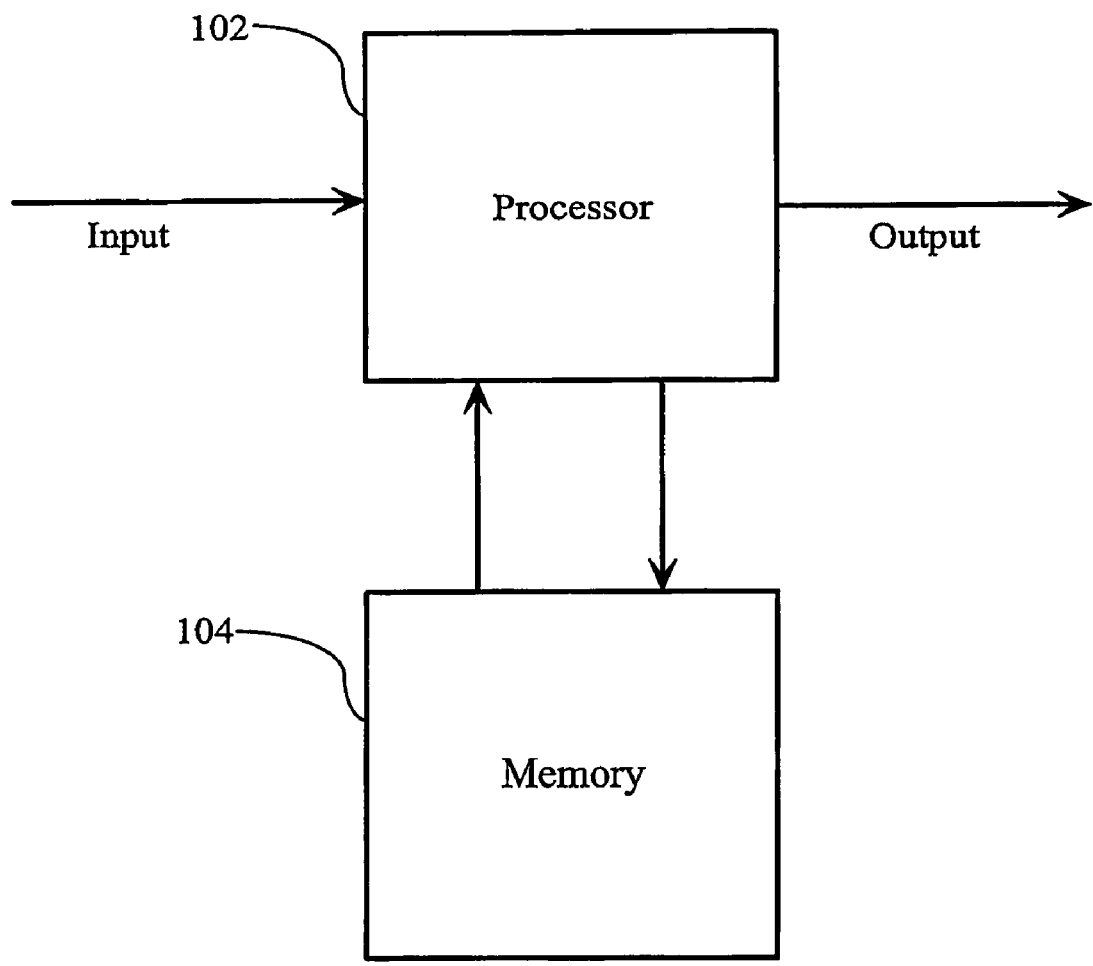
FIG. 1 illustrates a system of the prior art for processing and computing wavelet transforms.

FIG. 1 illustrates a system of the prior art for processing and computing wavelet transforms. Referring to FIG. 1, a system 100 comprises a processor 102 and a memory 104. Image data is input into the processor 102 and is divided into sub-blocks of data using known processing techniques. The bytes of data making up the sub-blocks are then subjected to wavelet transform algorithms. Specifically, the first sequence of data bytes needed for the particular wavelet transform are identified, and the first mathematical operation of the wavelet transform is performed, and the result stored in memory 104. Then the next mathematical operation of the wavelet transform is performed, and that result is also stored in memory 104. Each mathematical operation set forth in the wavelet transform is performed in this manner until the wavelet transform equation has been performed to its final result for the first sequence of data bytes.

Once all of the mathematical functions of the wavelet transform equation have been performed on the first sequence of data bytes, the next data-byte sequence is obtained (e.g., by moving the first byte in the first sequence out of consideration, moving each remaining byte up one position in the sequence, and inserting the next byte at the end of the sequence), and the process repeats on the new data-byte sequence. This process continues until the sub-block has been processed; then the next sub-block is processed identically, until the entire block has been processed.

As discussed above, the prior art method requires significant computing power, memory, and time. Data is continually being read, processed, and stored (written) to memory. Results from one computation may be required to perform another computation, requiring that the result itself be read and used for the new computation. This constant read-process-write procedure is time-consuming and requires significant computational power and storage capability.

Figure 2:
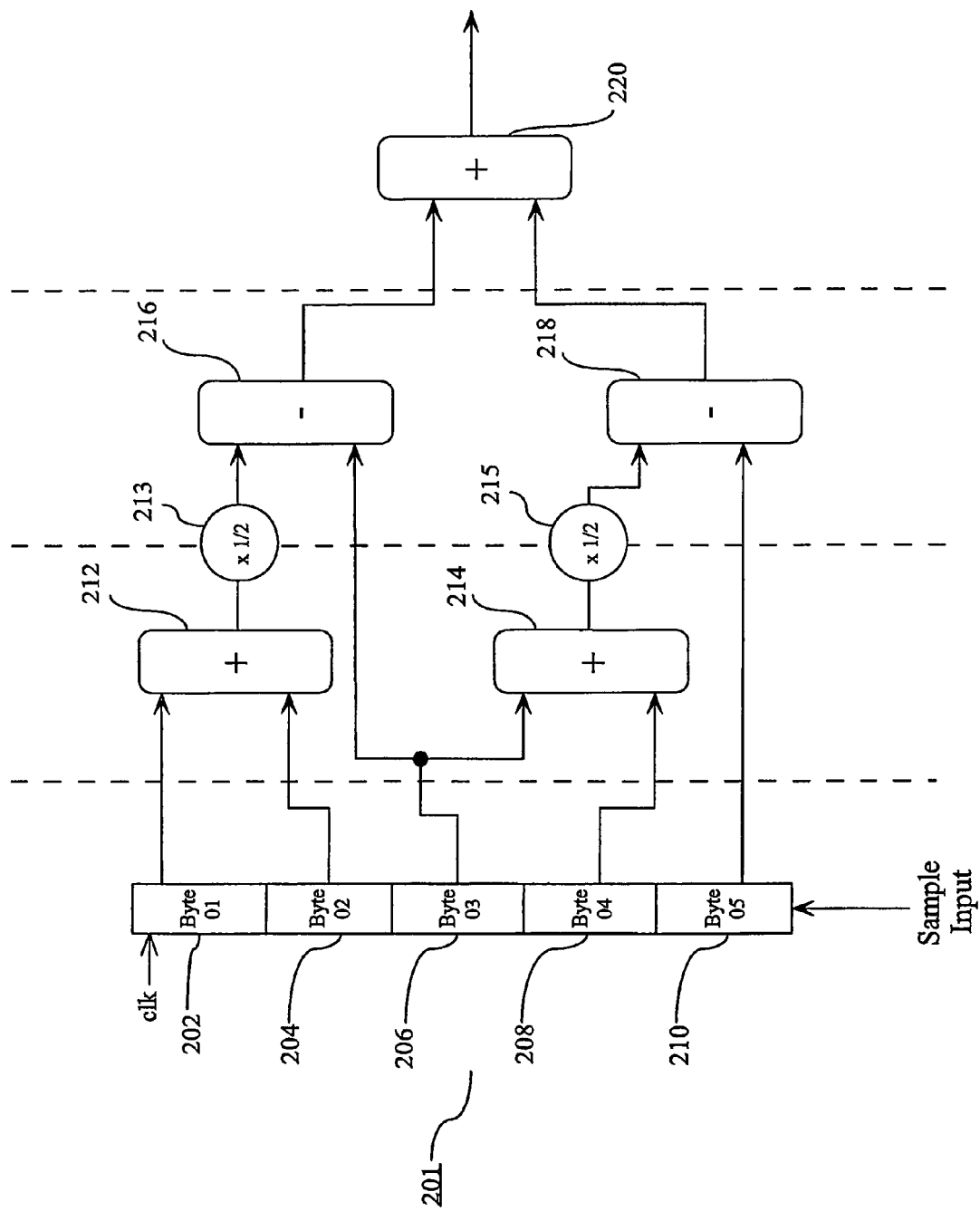
FIGS. 2 and 3 illustrate a first embodiment of the present invention relative to a 5-3 wavelet transform.
Figure 3:
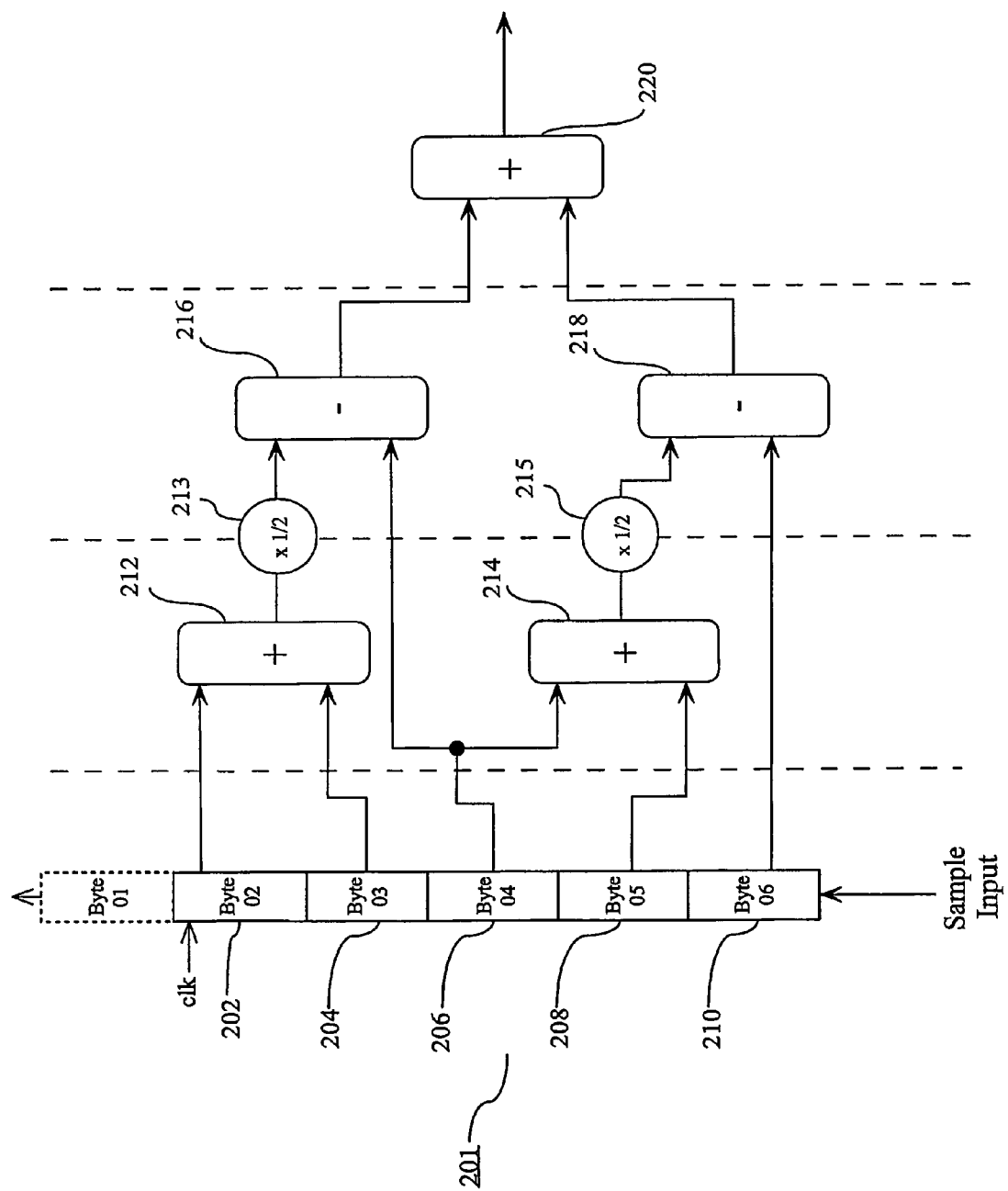

FIGS. 2 and 3 illustrate a first embodiment of the present invention relative to a 5-3 wavelet transform. For simplicity, the 5-3 wavelet transform equation is repeated below:

$$\left[\left((C_1 + C_2) \times \frac{1}{2}\right) - C_3\right] + \left[\left((C_3 + C_4) \times \frac{1}{2}\right) - C_5\right]$$

Referring to FIG. 2, a shift register 201, comprising a series of shift register bins 202, 204, 206, 208, and 210 is periodically clocked in a well-known manner so that, with each clock pulse a new 5-byte sample (in this example) is input to the shift register bins. The period of the clock pulse should be of a size sufficient for each of the math processors (described below) to have time to perform their particular process on the data in the shift register and output a result. In FIG. 2, the first five data bytes of a sample are shown in bins 202, 204, 206, 208, and 210, respectively. With each clock pulse a new 5-byte sequence is made available, so that at the first clock pulse, byte one in bin 202 will be "pushed out" of the shift register 201, byte two in bin 204 will be pushed to bin 202; byte three in bin 206 will be pushed to bin 204; byte four in bin 208 will be pushed to bin 206; byte five in bin 210 will be pushed to bin 208; and the next bit in order (byte six) will move into bin 210, as shown in FIG. 3.

As shown in the example of FIGS. 2 and 3, the bytes in each bin are input to math processors 212, 214, 216, 218, and 220. Math processors 212, 214, 216, 218, and 220 can comprise any known device for performing a mathematical function on input data, such as adders, subtractors, multipliers, or dividers or any combinations thereof. Logic devices for performing these and other mathematical functions are very well known and are not discussed further herein. In this example, math processors 212, 214, and 220 are adders and math processors 216 and 218 are subtractors.

The add/subtract operations performed by the math processors are carried out on the bytes in each bin. More specifically, in FIG. 2, the byte in bin 202 is added to the byte in bin 204 by math processor 212; and the byte in bin 206 is added to the byte in bin 208 by math processor 214.

The output of math processor 212 is shown as being multiplied by ½ (via multiplier 213) prior to being input to math processor 216. Thus, the byte in bin 206 is subtracted, by math processor 216, from one-half of the sum of bytes 202 and 204 that is output from math processor 212 which satisfies an analogous portion of the 5-3 wavelet transform equation.

Similarly, the sum from math processor 214 is multiplied by ½ (via multiplier 215) and this product is input to math processor 218. The data byte in bin 210 is then subtracted from this product by math processor 218. Finally, the result of the subtraction process from math processor 216 is added to the result from the subtraction process of math processor 218 by math processor 220, thereby outputting the 5-3 wavelet transform of the byte in bin 202.

Thus, as can be seen, the configuration illustrated in FIGS. 2 and 3 performs, in serial fashion, byte by byte, the operations of the equation of the 5-3 wavelet transform. No substantial memory is involved and there is no requirement for computer processors to perform the computation. The computation is done simply, quickly, and inexpensively using the shift register and math processor architecture shown in FIGS. 2 and 3, and there is no need to divide the data file being processed into sub-blocks.

Figure 4:
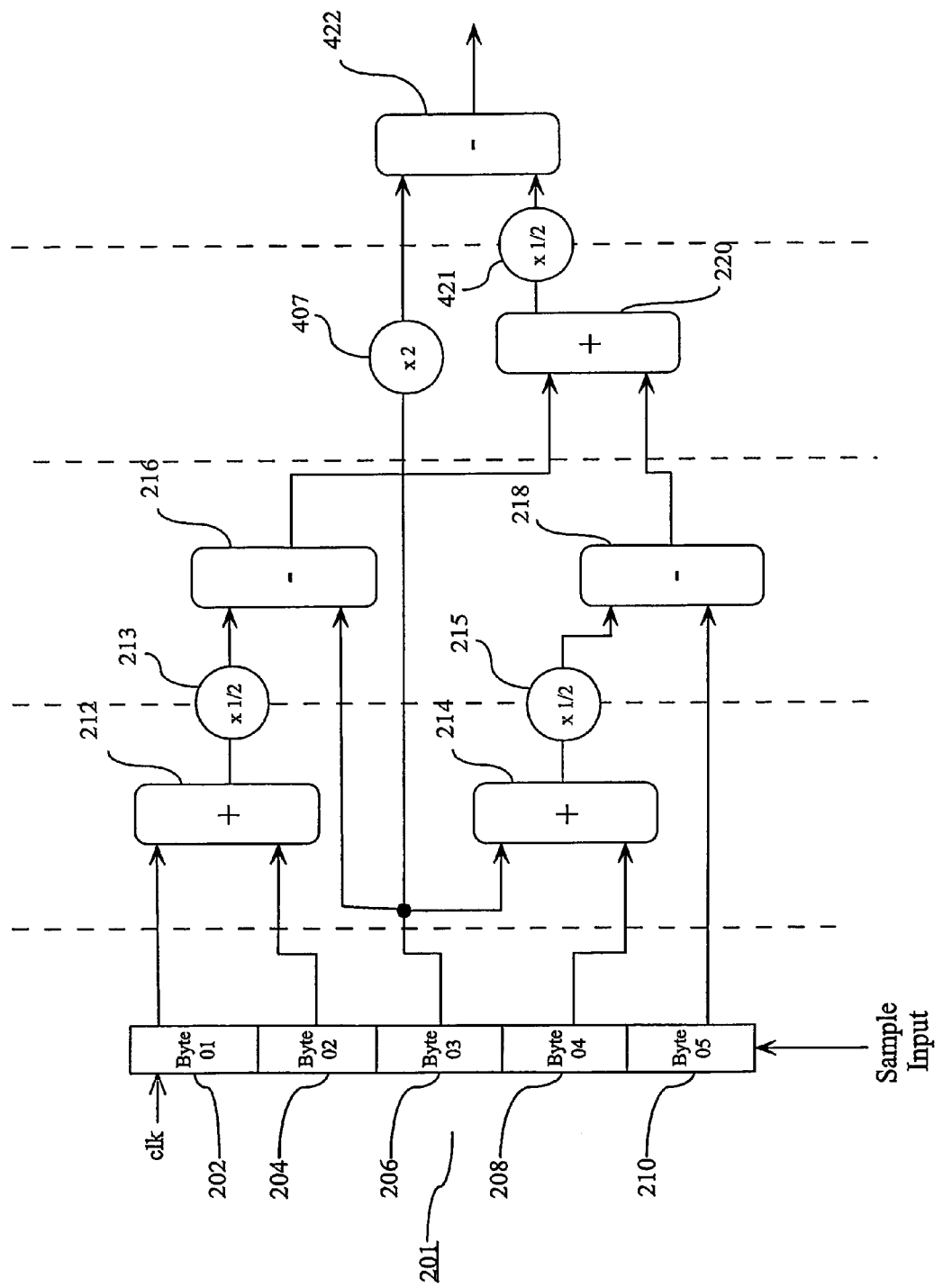
FIG. 4 illustrates a system for computing a 5-4 wavelet transform on data.

FIG. 4 illustrates a system for computing a 5-4 wavelet transform on data, which will solve the 5-4 wavelet transform equation:

$$\frac{[C_3 \times 2 -] \left[ \left( (C_1 + C_2) \times \frac{1}{2} \right) - C_3 \right] + \left[ \left( (C_3 + C_4) \times \frac{1}{2} \right) - C_5 \right]}{2}$$

The process is essentially the same as that of FIG. 2, with the exception that an additional stage (math processor 422), and multipliers 405 and 421, are added. Multiplier 405 multiplies the byte in byte bin 206 by two, and multiplier 421 multiplies the output from math processor 220 by one-half. These two products are subjected to a subtraction process by math processor 422 to perform the additional mathematical functions of the 5-4 wavelet transform equation.

The hardware components used to perform the above-described functions can be any known hardware components that can perform the adding, subtracting, and multiplying functions described above. The shift register can be, for example, SN7474 shift registers manufactured by Motorola or Texas Instruments; LSI Logic also makes shift registers that can perform the above-described functions. The math processor, as noted above, can be any known device (e.g., logical adders, subtractors, multipliers or dividers) capable of carrying out the function required by the wavelet transform.

In FIGS. 2-4, hardware multipliers are shown to perform the halving or doubling functions described above (or any other mathematical multiplication function required of a wavelet transform equation). As an alternative, in a preferred embodiment, adjacent math processors (e.g., math processor 212 and math processor 216) can be hardwired so that the output from the first math processor (e.g., math processor 212) is wired to the second math processor (e.g., math processor 216) such that the input to the second math processor is shifted by one decimal place, thereby halving or doubling (depending upon which direction the decimal place is moved, as is well-known) the value output from the first math processor. This will reduce the number of hardware elements required and thus reduce cost and size requirements. Any known math processing hardware/method can be used as long as it performs the function required of the equation.

The above-described method can be used to perform the mathematical functions of any wavelet transform equation and it is understood that one of ordinary skill in the art can easily determine the exact mapping needed based on a simple analysis of the particular equation in view of the invention disclosed above and claimed herein.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method for computing the wavelet transform of a plurality of data bytes in a data file, comprising the steps of:
identifying all mathematical operations to be preformed by the wavelet transform;
identifying math processors to perform each of said mathematical operations; and
mapping said plurality of data bytes to said math processors to perform said mathematical operations on each of said data bytes, wherein said mathematical operations are performed periodically on a subset of said plurality of data bytes input serially and continuously to a shift register, the period being based on a clock pulse, further comprising the steps of:
clocking said shift register with said clock pulse, so that upon the occurrence of each clock pulse, a new subset of said plurality of data bytes has said mathematical operations performed thereon thereby resulting in said data file being processed serially as it flows continuously through the shift register.

2. The method as set forth in claim 1, wherein said subset of said plurality of data bytes are in sequential order based on their position in said data file, and wherein said shift register includes a first bin, a second bin, and a last bin, and wherein upon the occurrence of each clock pulse:
the data byte in said first bin is removed from said shift register;
each remaining data byte in said shift register is moved up in order so that said data byte in said second bin is moved to the first bin in said shift register; and
the next data byte, based on the position of said data bytes in said data file, is moved into the last bin of said shift register.

3. The method as set forth in claim 2, wherein said math processors include adders and subtractors.

4. The method as set forth in claim 3, wherein said math processors further comprise means for performing multiplication and division on outputs thereof.

5. The method as set forth in claim 4, wherein said means for performing multiplication and division comprises a multiplier/divider.

6. The method as set forth in claim 4, wherein said means for performing multiplication and division comprises configuring the connections of said multiplied/divided outputs to subsequent math processors to effect said multiplication/division function.

7. A system for computing the wavelet transform of a plurality of data bytes in a data file, comprising:
a shift register for receiving a subset of said plurality of data bytes;
a plurality of math processors operatively coupled to said shift register and mapped to perform each mathematical operation of said wavelet transform; and
a clock signal coupled to said shift register;
whereby upon the occurrence of each clock signal, a new subset of said data bytes is presented to said system for use in computing the wavelet transform, and whereby the number of clock pulses required to perform said computation on each of said plurality of data bytes is equal to the total number of data bytes in said data file.

8. The system of claim 7, wherein said math processors include adders and subtractors.

9. The system of claim 8, wherein said math processors further comprise means for performing multiplication and division on outputs thereof.

10. The system of claim 9, wherein said means for performing multiplication and division comprises a multiplier/divider.

11. The system of claim 10, wherein said means for performing multiplication and division comprises configuring the connections of said multiplied/divided outputs to subsequent math processors to effect said multiplication/division function.

12. A system for computing the wavelet transform of a plurality of data bytes in a data file, comprising:
- means for identifying all mathematical operations to be performed by the wavelet transform;
- means for identifying math processors to perform each of said mathematical operations; and
- means for mapping said plurality of data bytes to said math processors to perform said mathematical operations on each of said data bytes, wherein said mathematical operations are performed periodically on a subset of said plurality of data bytes input serially and continuously to a shift register, the period being based on a clock pulse, said system further comprising:
- means for clocking said shift register with said clock pulse, so that upon the occurrence of each clock pulse, a new subset of said plurality of data bytes has said mathematical operations performed thereon thereby resulting in said data file being processed serially as it flows continuously through the shift register.

13. The system of claim 12, wherein said subset of said plurality of data bytes are in sequential order based on their position in said data file, and wherein said shift register includes a first bin, a second bin, and a last bin, said system comprising:
- means for, upon the occurrence of each clock pulse;
- removing the data byte in said first bin from shift register;
- moving each remaining data byte in said shift register up in order so that said data byte in said second bin is moved to the first bin in said shift register; and
- moving the next data byte, based on the position of said data bytes in said data file, into the last bin of said shift register.

14. The system of claim 13, wherein said math processors include adders and subtractors.

15. The system of claim 14, wherein said math processors further comprise means for performing multiplication and division on outputs thereof.

16. The system of claim 15, wherein said means for performing multiplication and division comprises a multiplier/divider.

17. The system of claim 15, wherein said means for performing multiplication and division comprises configuring the connections of said multiplied/divided outputs to subsequent math processors to effect said multiplication/division function.

* * * * *